Oct. 12, 1954

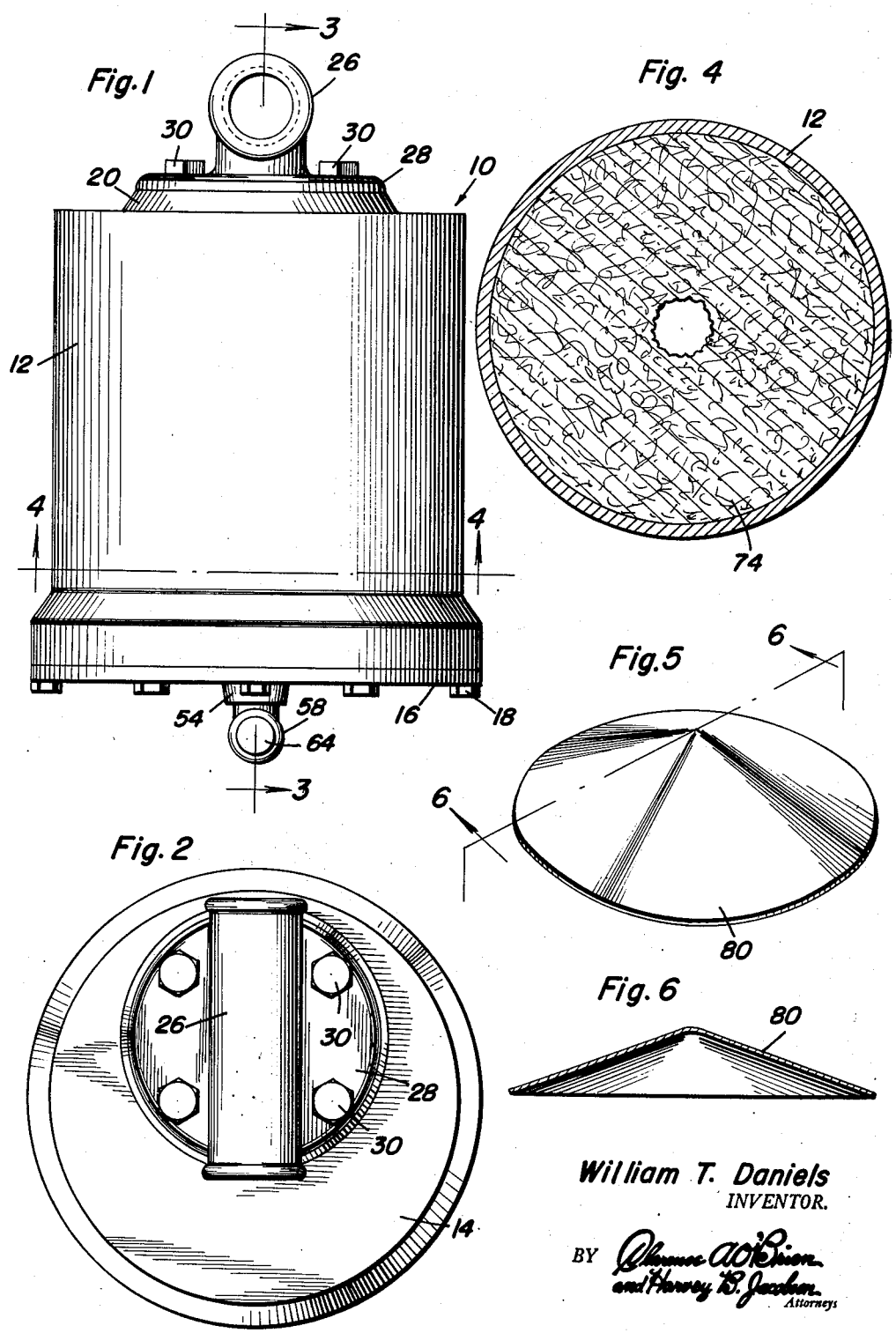

W. T. DANIELS 2,691,425

CONDENSER TYPE AIR CLEANER

Filed Dec. 12, 1952

William T. Daniels
INVENTOR.

BY *[signatures]*
Attorneys

Patented Oct. 12, 1954

2,691,425

UNITED STATES PATENT OFFICE 2,691,425

CONDENSER TYPE AIR CLEANER

William T. Daniels, Pittsburgh, Pa.

Application December 12, 1952, Serial No. 325,591

10 Claims. (Cl. 183—48)

This invention is a continuation-in-part of my prior co-pending application, Serial No. 735,937, filed March 20, 1947, now Patent No. 2,623,609, issued December 30, 1952, for Air Cleaner, and relates more particularly to a condenser type of air cleaner adapted to be inserted in a conduit between an air pump, compressor or pressure tank and the device to be supplied with pressurized air for condensing and receiving oil or other liquid which may have become vaporized and mixed with the air.

Pumps and compressors of all types which supply air under pressure for different uses become extremely hot. This heat vaporizes the lubricating oil which mixes with and contaminates the compressed air delivered by the pumps. In the case of rotary pumps, the whirling blades further agitate and vaporize the oil. The air containing the entrained, vaporized oil and/or water vapor is usually considerably above room temperature, as for example 60° to 70° above room temperature. In order to remove this oil vapor from the compressed air delivered by the pumps or compressors it must be cooled in order to condense the oil vapor therein to permit separation of the latter.

A primary object of the invention is to provide an oil vapor condenser of simple construction which may be secured intermediate the ends of a pipe or conduit of any nature used to operatively connect a compressor or compressed air tank with pneumatic tools, or other devices adapted for using the pressurized air, the device being adapted for construction in various suitable sizes rendering the same suitable for attachment to the tank or pump or to the air operating device, in the latter case, the size of the oil condenser being ordinarily reduced to minimize the weight and bulk thereof.

A further basic object of this invention is to provide an oil condensing air cleaner which shall be capable of condensing and removing the oil and/or water vapors entrained in a stream of heated air of great volume and low pressure as the latter leaves the air pump or compressor.

It is a further important object of this invention to provide for the easy removal of condensation oil or water impurities in the air after the accumulation of these impurities in a receptacle provided therefor.

It is a further object of this invention to generally simplify the construction of oil condensing air cleaners.

Yet another important object of this invention is to provide an oil condensing air cleaner with spaced foraminous pads for cooling, condensing and separating oil vapor from a stream of compressed air and which is extremely conveniently applicable to and removable from the cleaner, thus making the maintenance thereof simpler and easier.

And the last object to be specifically enumerated herein is to provide a condenser type air cleaner which is relatively inexpensive and practical to manufacture, simple and convenient to install and use, and which will give generally efficient and durable service.

With these and other objects definitely in view, this invention resides in certain novel features of construction, combination and arrangement of parts and portions as will be hereinafter described in detail and particularly set forth in the appended claims, reference being had to the accompanying drawings which form a material part of this application, and in which:

Figure 1 is an elevational view showing one suitable embodiment of condenser type of air cleaner incorporating therein the principles of this invention;

Figure 2 is a top plan view of the same;

Figure 4 is a horizontal sectional view through the condenser type cleaner of Figure 1, it being taken substantially upon the plane indicated by the section line 4—4 of Figure 1;

Figure 5 is a perspective view of a modified baffle element forming a part of this invention; and Figure 6 is a vertical transverse sectional view taken substantially upon the plane indicated by the section line 6—6 of Figure 5.

Figure 3:
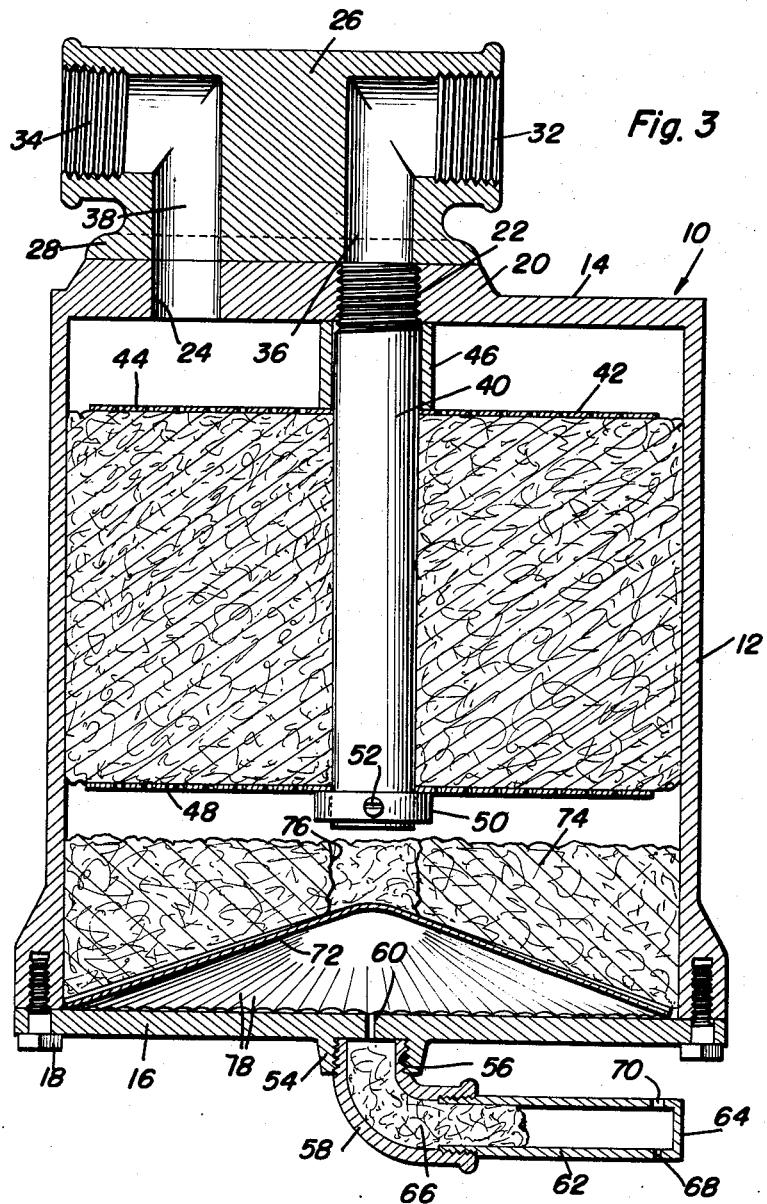
Figure 3 is a vertical central sectional view through the cleaner of Figure 1, taken substantially on the plane indicated by the section line 3—3 of Figure 1.

Referring now more specifically to the accompanying drawings, wherein like numerals designate similar parts throughout the various views, it will be seen that the condenser air cleaner incorporating therein the principles of this invention is indicated generally by the numeral 10 and is generally of a cylindrical shape consisting of a metallic cylindrical body portion 12 having a top closure wall 14 which, as shown, may be integral with the same, and constitutes a top for the condenser, together with a removable bottom closure wall 16 which is detachably secured to the open bottom end of the cylindrical container as by cap screws or the like 18. Disposed eccentrically of the same the top wall 14 upon its top surface is provided with an upwardly extending circular boss 20, see Figure 2, and an internally threaded bore 22 extends through this boss in a position which is axial of the cylindrical container 12. Also extending through the boss is a bore 24 which is preferably unthreaded.

A T-shaped coupling member 26 is provided having a circular flanged base 28 which is adapted to seat upon the upper surface of the boss 20, the coupling being retained upon the boss in a removable fashion as by the use of cap screws 30 extending through the flange 28.

A pair of horizontal internally threaded oppositely disposed and aligned bores 32 and 34 are provided in the T-shaped coupling 26 and extend horizontally therein, each of these bores having intersection with a vertically disposed passage 36 and 38 respectively which passages in turn respectively register with the bores 22 and 24 previously mentioned. The bores 32, 36 and 22 constitute a means whereby air having an oil or water vapor content from the source of pressure enters the condenser air cleaner, while the bores 24, 38 and 34 constitute means whereby the air after being cleansed by the condenser of its oil and/or water vapor is discharged to the place of use. As will be readily understood suitable conduits are connected to the bores 32 and 34.

Threaded into the bore 22 and depending axially into the cylindrical container 12 is a pipe 40 having an open lower end which terminates in spaced relation to the bottom wall 16 of the container as shown in Figure 3. Thus, the air flowing into the condenser is discharged adjacent the bottom end thereof. Mounted upon the air discharge pipe 40 is a cylindrical mass of condensing and filtering material 42 of any desired character, the same being retained in place by an upper foraminous disk or plate 44 which rests against the lower end of a spacer sleeve 46 surrounding the upper end of the pipe 40, and a lower foraminous disk 48 which engages the under surface of the filtering material, being retained as by a collar 50 and set screw 52 which are adjustably engaged upon the lower end of the pipe 40. The material 42 is of a good heat conducting nature, such as copper ribbon and the like.

As so far described, it will now be apparent that air being discharged from the lower end of the pipe 40 will pass upwardly through the mass of condensing and filtering material 42, the vaporized oil and water being cooled and condensed thereby, and thus being cleansed of all moisture and foreign matter during such passage, and the cleansed and filtered air will then be discharged by means of the bores 24, 38 and 34 and the associated discharge conduit to the place of use. The heat absorbed and removed from the oil vapor by the material 42 will be discharged to the walls 12. The condensed liquid will drip downwardly through the material 42 into the bottom of the cylinder 12, thus maintaining the material 42 free of impurities.

Depending from the center of the underside of the bottom closure member 16 is a tubular boss 54 which is internally threaded as at 56 to receive the elbow 58. A passage or aperture 60 of relatively small size extends up through the closure plate 16 centrally of the boss 54 and communicates with the interior of the cylindrical receptacle 12. This aperture 60 is of a very limited or restricted cross-section as compared with the inlet and outlet bores 36 and 38, so that only a negligible quantity of air will be capable of passing through the passage 60 and elbow 58 and thus will not appreciably reduce the pressure of the compressed air passing through the condenser.

In order to further reduce such passage, the open end of the elbow is provided with a screw-threadedly attached cylindrical casing 62 having a closed outer end 64 and which casing is in free communication with the interior of the elbow. A mass of fibrous material 66 of any desired character is loosely packed in the elbow in the adjacent end of the member 62 to further minimize any loss of air and pressure through the passage 60.

At its outer end, the casing member 62 is provided with a pair of vertically disposed vents, a relatively small liquid discharge vent 68 being provided on the bottom surface, while a somewhat larger air, gas or vapor discharge vent 70 is provided upon the upper surface of the cylindrical casing.

A generally conical baffle member 72 of a slightly less diameter than the interior of the cylindrical casing 12 is seated upon the bottom closure plate 16 thereof and above the passage 60. Supported by this baffle and thus held out of contact with the passage 60 is a mass of packing 74 of any desired character, and having an axial passage or opening 76 therethrough in alignment with the discharge end of the pipe 40.

As shown at 78 in Figure 3, the conical baffle 72 is provided with corrugations or flutes radiating from the apex of the same to provide channels for the passage of air and/or moisture downwardly along the baffle.

In operation, any droplets of moisture entrained in the air discharged from the pipe 40 will be thrown downwardly through the passage 76 to impinge directly upon the apex of the conical baffle member 72, and this moisture will then drain down beneath the packing 74 through the troughs 78, around the lower perimeter of the baffle, and will collect under the same and be discharged through the passage 60 into the packing material 66, from whence it will travel into the casing 62. Oil or water vapor condensed from the compressed air by the material 42 as above mentioned will likewise drain down the baffle into the elbow 58. From the casing 62, liquid will be drained through the smaller vent 68 downwardly, while any air passing into the same will escape upwardly through the vent 70. However, as pointed out above, it is contemplated that a relatively small quantity of air will pass through the device.

As shown in Figures 5 and 6 a modified form of baffle 80 may be utilized in which the flutes or troughs 78 of Figure 3 have been omitted.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A liquid condensing and separating air cleaner comprising a cylindrical casing having top and bottom walls, said top wall having an air inlet means and an air discharge means, a pipe disposed axially within said casing and communicating with one of said means, said pipe having its lower end disposed in the lower portion of said casing and above the bottom wall, liquid condensate drain means communicating with the interior of the casing through the bottom wall, a lower body of filtering material interposed between the lower end of said pipe and said drain means and having a central aperture therethrough in alignment with said pipe, an upper body of filtering material interposed between said pipe and casing and between the lower end of the pipe and the top wall, means spacing said upper body of material from the top wall and means retaining said upper body upon said pipe.

2. The combination of claim 1 wherein said spacing means comprises a sleeve slidable upon said pipe and abutting said top wall, a perforated plate resting upon said upper body of material and abutting said sleeve.

3. The combination of claim 1 wherein said retaining means comprises a perforated disk supporting said upper body of material, a collar adjustable longitudinally upon said pipe and engaging and supporting said disk.

4. The combination of claim 1 wherein said lower body of material has a central bore in alignment with said pipe and said drain means.

5. A liquid condensing and separating air cleaner comprising a cylindrical casing having top and bottom walls, said top wall having an air inlet means and an air discharge means, a pipe disposed axially within said casing and communicating with one of said means, said pipe having its lower end disposed in the lower portion of said casing and above the bottom wall, liquid condensate drain means communicating with the interior of the casing through the bottom wall, a lower body of filtering material interposed between the lower end of said pipe and said drain means and having a central aperture therethrough in alignment with said pipe, an upper body of filtering material interposed between said pipe and casing and between the lower end of the pipe and the top wall, means spacing said upper body of material from the top wall and means retaining said upper body upon said pipe, a baffle interposed between said pipe and said drain means, said baffle supporting said lower body of material spaced from said drain means.

6. The combination of claim 5 wherein said baffle is conical with its base on the bottom wall.

7. The combination of claim 5 wherein said baffle is conical with its base on the bottom wall, the surface of said baffle having flutes or channels radiating upon its upper surface from its apex to its base.

8. The combination of claim 5 wherein said baffle is conical with its base on the bottom wall, said lower body of material resting upon said baffle.

9. The combination of claim 5 wherein said baffle is conical with its base on the bottom wall, said lower body of material resting upon said baffle, said lower body being spaced below the upper body and the lower end of said pipe.

10. The combination of claim 1 wherein said drain means includes a liquid condensate vent and an air vent.

References Cited in the file of this patent

UNITED STATES PATENTS

| Number | Name | Date |
|---|---|---|
| 1,939,151 | Thompson | Dec. 12, 1933 |
| 2,513,556 | Furczyk | July 4, 1950 |
| 2,572,311 | Burd | Oct. 23, 1951 |